(12) United States Patent
Komori et al.

(10) Patent No.: US 7,476,439 B2
(45) Date of Patent: Jan. 13, 2009

(54) CARBON FIBER COMPOSITE MATERIAL AND WET FRICTION MEMBER

(75) Inventors: Kentaro Komori, Saitama (JP); Satoshi Yoshida, Saitama (JP); Atsushi Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 436 days.

(21) Appl. No.: 11/288,141

(22) Filed: Nov. 29, 2005

(65) Prior Publication Data

US 2006/0121263 A1 Jun. 8, 2006

(30) Foreign Application Priority Data

Dec. 2, 2004 (JP) ............................... 2004-349222

(51) Int. Cl.
*B32B 17/12* (2006.01)
(52) U.S. Cl. .................................. 428/293.4; 428/408
(58) Field of Classification Search ................ 428/408, 428/293.4, 64.1, 66.2, 315.5, 317.9; 181/251 R, 181/251 A
See application file for complete search history.

(56) References Cited

U.S. PATENT DOCUMENTS

| 4,582,751 | A | * | 4/1986 | Vasilos et al. ............. 428/307.3 |
| 5,045,356 | A | * | 9/1991 | Uemura et al. ............ 427/249.2 |
| 5,091,164 | A | * | 2/1992 | Takabatake ............. 423/445 R |
| 5,962,135 | A | * | 10/1999 | Walker et al. ................ 428/408 |
| 6,030,698 | A | * | 2/2000 | Burchell et al. ........... 428/315.5 |
| 6,083,614 | A | * | 7/2000 | Gordeev et al. ........... 428/317.9 |
| 6,207,264 | B1 | * | 3/2001 | Robinson et al. .......... 428/304.4 |
| 6,323,160 | B1 | * | 11/2001 | Murdie et al. ................ 508/109 |
| 6,858,302 | B2 | * | 2/2005 | Loszewski ................... 428/408 |
| 6,878,331 | B2 | * | 4/2005 | Huang et al. ................ 264/434 |
| 7,294,388 | B2 | * | 11/2007 | Lam et al. .................... 428/143 |
| 2004/0033341 | A1 | * | 2/2004 | Lam et al. .................... 428/143 |
| 2007/0275863 | A1 | * | 11/2007 | Whitmarsh ................... 508/123 |
| 2007/0298211 | A1 | | 12/2007 | Komori et al. |

FOREIGN PATENT DOCUMENTS

| EP | 1826256 | * | 8/2007 |
| JP | 07-18091 A | | 1/1995 |
| JP | 09-144790 A | | 6/1997 |
| JP | 11-005850 A | | 1/1999 |

\* cited by examiner

*Primary Examiner*—N. Edwards
(74) *Attorney, Agent, or Firm*—Arent Fox LLP

(57) ABSTRACT

The present invention provides a wet friction member exhibiting excellent dynamic friction performance and a carbon fiber composite material for manufacturing the wet friction member. A carbon fiber composite material 10 of the present invention contains carbon fibers 11 and a matrix 12 joining the carbon fibers 11 with each other, and the matrix has fine pores having diameters of 3.5 nm to 100 nm. Since the fine pores having diameters of a nanometer (nm) order is formed in the matrix 12 of the carbon fiber composite material 10, the specific surface area of the carbon fiber composite material 10 is increased. As a result, a wet friction member made of the carbon fiber composite material 10 has an improved dynamic friction performance.

6 Claims, 8 Drawing Sheets

CARBON FIBER COMPOSITE MATERIAL AND WET FRICTION MEMBER

BACKGROUND OF THE INVENTION

1. Field of the Invention

The present invention relates to a carbon fiber composite material and a wet friction member, and particularly, the wet friction member used for a wet clutch for an automatic change gear of a vehicle and the carbon fiber composite material used for the wet friction member.

2. Description of the Prior Art

There has been conventionally a so-called carbon fiber composite material (for example, refer to Patent Document 1) in which the carbon fiber is blended as one of the wet friction member materials, and it has been known that the carbon fiber composite material exhibits excellent durability and heat resistance in a severe friction atmosphere. For example, the carbon fiber composite material is manufactured by impregnating a woven cloth or nonwoven cloth of the carbon fiber with the thermosetting resin, and heating a thermosetting resin to carbonize.

[Patent Document 1] Japanese Published Unexamined Patent Application No. H11-5850 (paragraphs 0011 to 0018)

Referring to the friction performance of the wet friction member used for the automatic change gear or the like of the vehicle, it has been known that a change of the torque or friction coefficient in the friction engaging process of a friction member and its mating member, so-called dynamic friction performance affects the generation of shock and judder or the like at the time of shift transmission. So as to suppress the generation of shock or judder conventionally, the dynamic friction performance is adjusted by the quality of the material and property of an ATF (automatic transmission fluid) additive agent or the wet friction member.

Furthermore, since the wet friction member made of the carbon fiber composite material has a surface having a smaller amount of functional groups as compared with a paper wet friction member made of a cellulose fiber and an aramid fiber or the like, the effect of the ATF additive agent conventionally used is not fully exhibited.

On the other hand, the immunity of the oil film formed by the ATF is generally increased by enhancing the porosity of the wet friction member. As a result, the dynamic friction performance of the wet friction member is improved.

However, the carbon fiber usually used for the wet friction member made of the carbon fiber composite material is inflexible as compared with fibers such as the cellulose fiber and the aramid fiber, and the fiber diameter is larger. Thereby, the average pore diameter is larger, and the average pore diameter of the paper wet friction member is several μm. On the contrary, the average pore diameter of the wet friction member made of the carbon fiber composite material is several-tens μm. As a result, even if the porosity of the wet friction member made of the carbon fiber composite material is the same as that of the paper wet friction member, it is difficult to enhance the dynamic friction performance of the wet friction member made of the carbon fiber composite material as compared with the paper wet friction member.

It is an object of the present invention to provide a wet friction member exhibiting excellent dynamic friction performance and a carbon fiber composite material used for the wet friction member.

SUMMARY OF THE INVENTION

The present invention for solving the above-mentioned problems provides a carbon fiber composite material containing carbon fibers and a matrix joining the carbon fibers with each other, and the matrix has fine pores having diameters of 3.5 nm to 100 nm.

The carbon fiber composite material has fine pores having diameters of 3.5 nm to 100 nm. As a result, the fine pores give a larger specific surface area to the carbon fiber composite material even if the absolute pore volume (the total volume of the fine pores) is small. Therefore, the wet friction member made of the carbon fiber composite material has improved dynamic friction performance as compared with a wet friction member made of a conventional carbon fiber composite material.

Since the carbon fiber composite material has a matrix in which the fine pores are formed, and the fine pores have diameters of a nanometer (nm) order, the carbon fiber composite material can prevent the structural strength required as the wet friction member from being inhibited by its porosity.

Examples of the carbon fiber composite materials include a carbon fiber composite material having the fine pores having median diameters of 5.0 nm to 55 nm.

In the present invention, it is preferable that the carbon fiber composite material further has coarse pores having diameters of 4 μm to 60 μm. Examples of the carbon fiber composite materials include a carbon fiber composite material having coarse pores having median diameters of 5.0 μm to 30 μm.

The carbon fiber composite material further has coarse pores in addition to the fine pores. As a result, the carbon fiber composite material has increased porosity as compared with the carbon fiber composite material having only the fine pores. That is, it is considered that the absolute amount of the pores is increased by adding the coarse pores and the dynamic friction performance is further improved.

The above carbon fiber composite material provides the wet friction member using the carbon fiber composite material.

The present invention can provide the wet friction member exhibiting excellent dynamic friction performance and the carbon fiber composite material for manufacturing the wet friction member.

Also, the present invention concerns a process for producing carbon fiber composite material comprising carbon fibers, and a matrix joining the carbon fibers with each other, wherein the matrix having fine pores having diameters of 3.5 nm to 100 nm which comprises:

incorporating a matrix into said carbon fiber;

heating the matrix having the matrix incorporated therein under a pressure to give a mold, and firing the resulting mold to give a carbon fiber composite material.

In the process according the invention, the molding may be produced by hot pressing. In the process according the invention, the firing may be conducted under an inert gas atmosphere.

Figure 2:
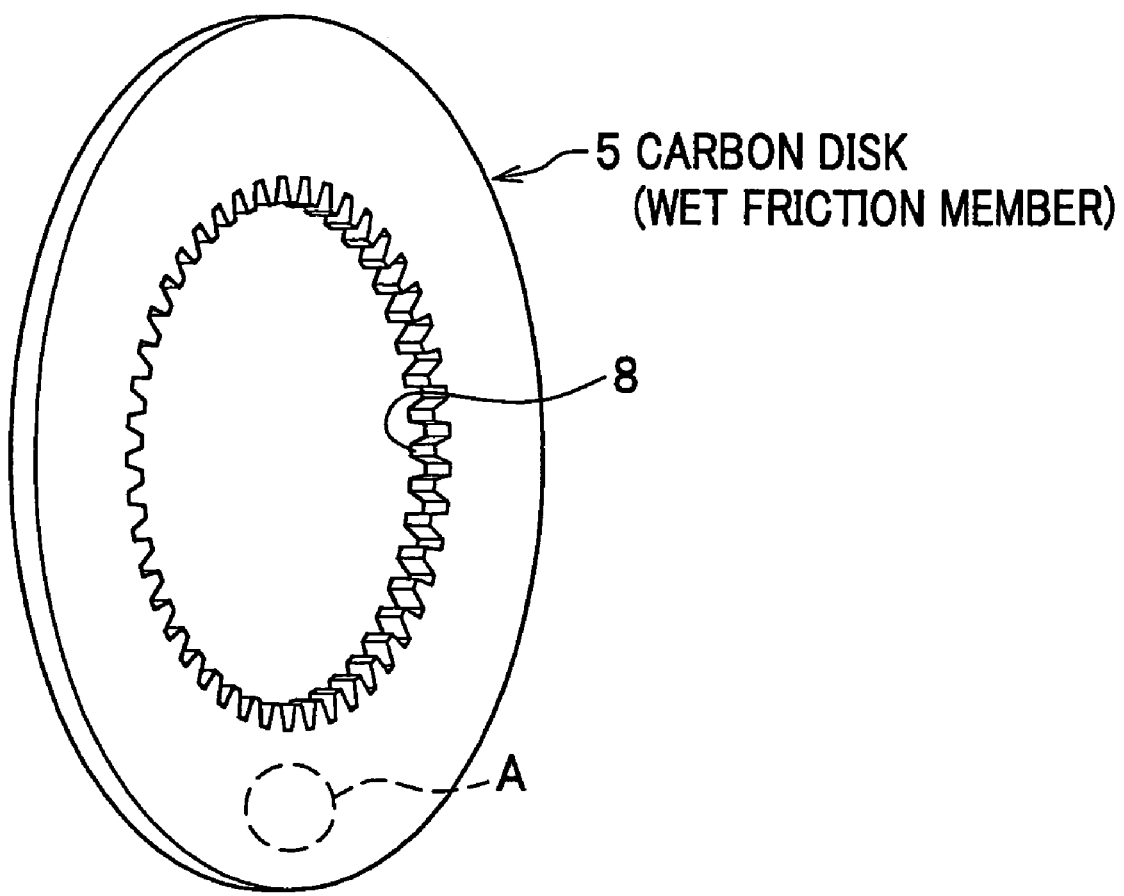
FIG. 2 is a perspective view of the wet friction member according to the embodiment.
Figure 3:
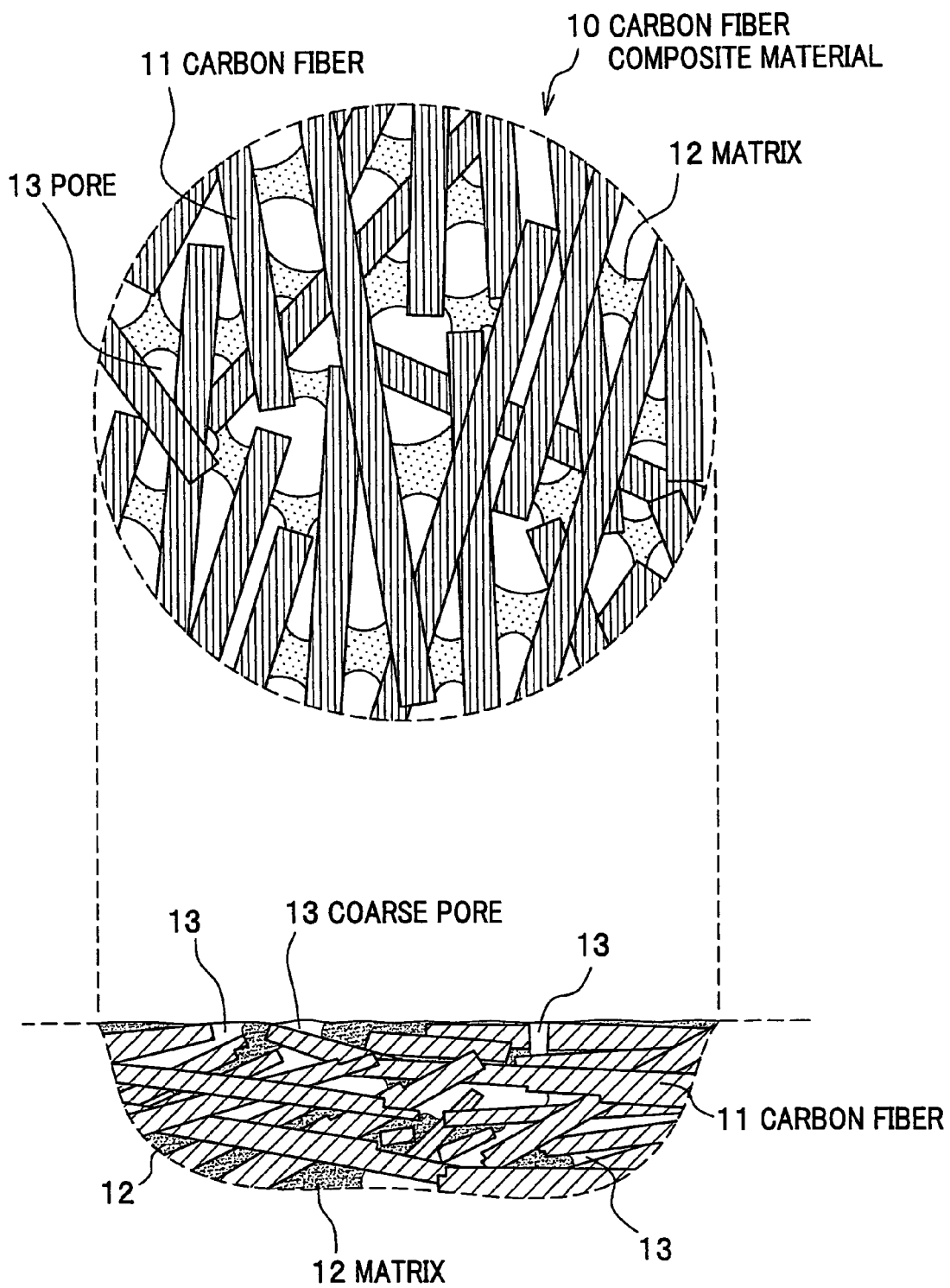
Figure 4A:
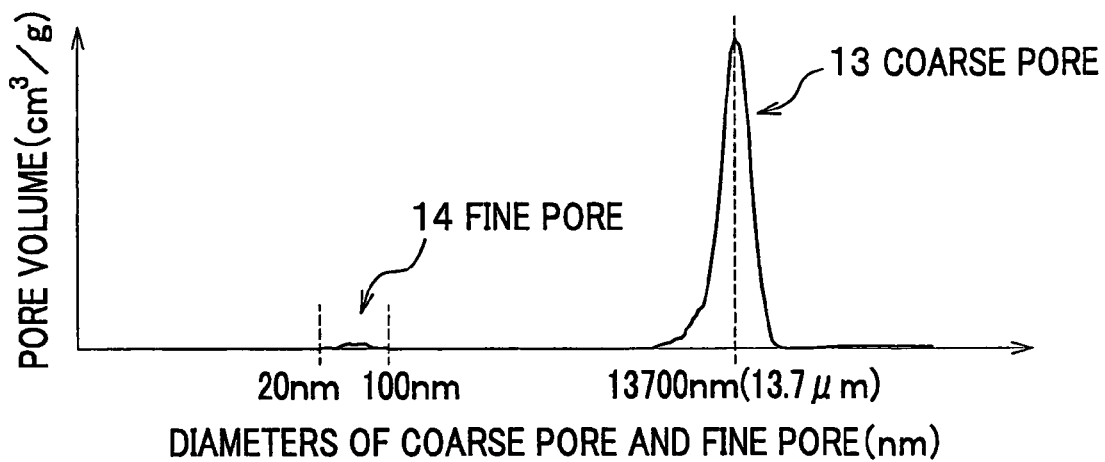
Figure 4B:
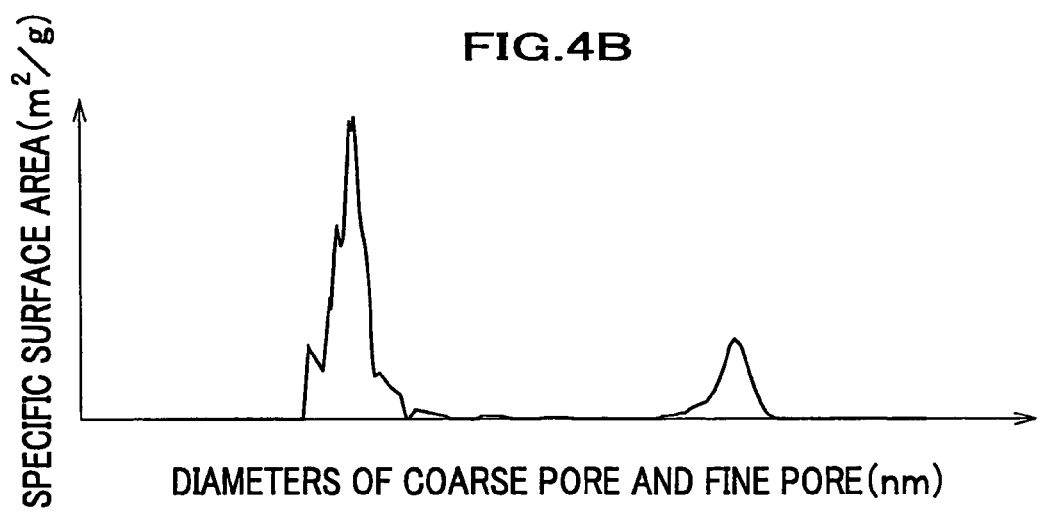
Figure 4C:
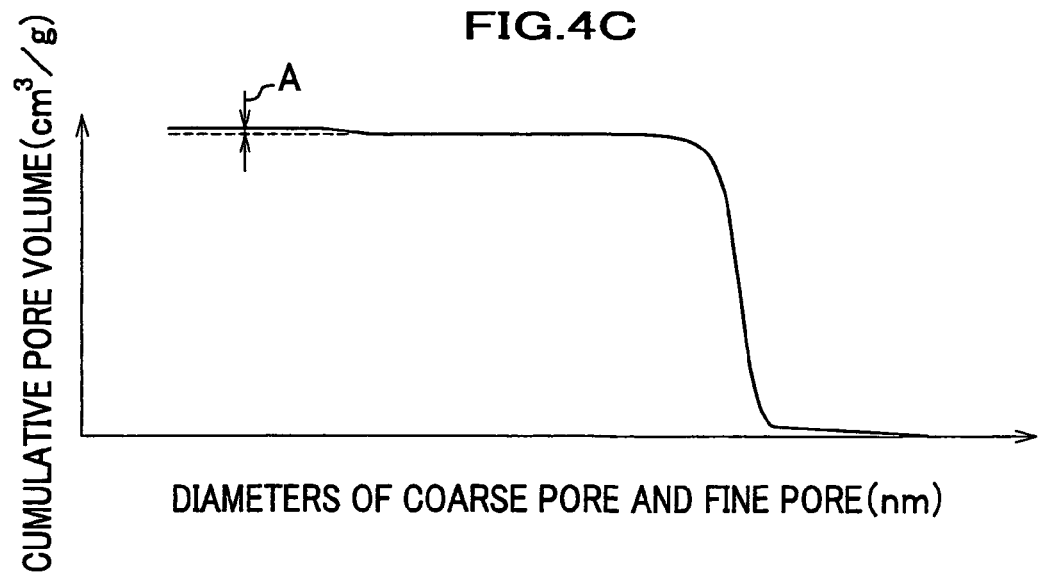
Figure 5A:
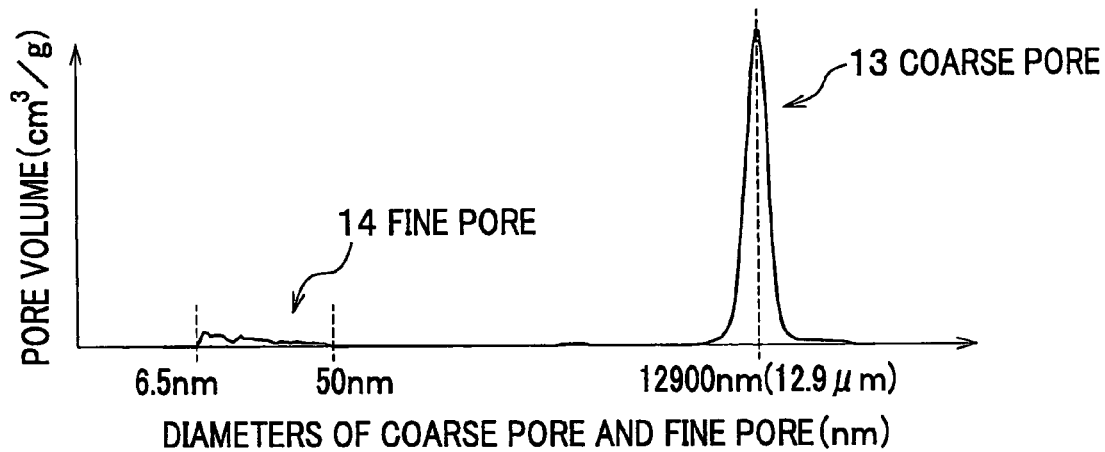
Figure 5B:
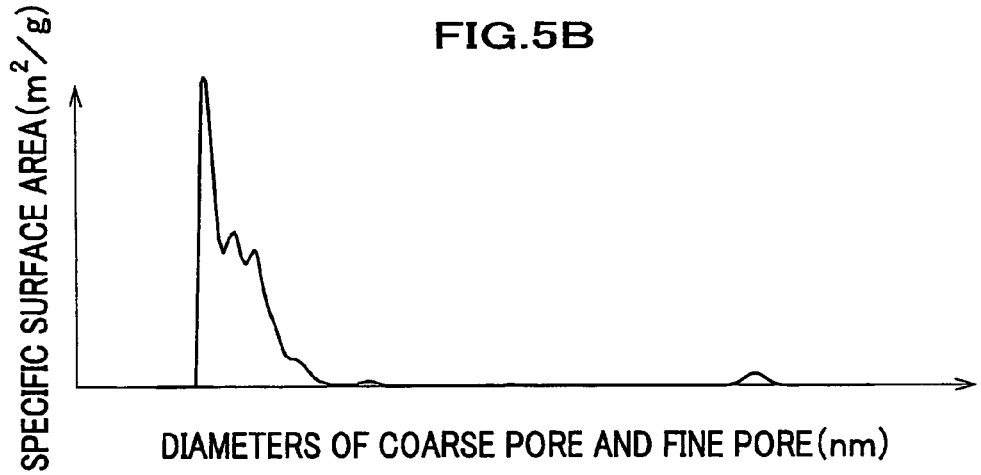
Figure 5C:
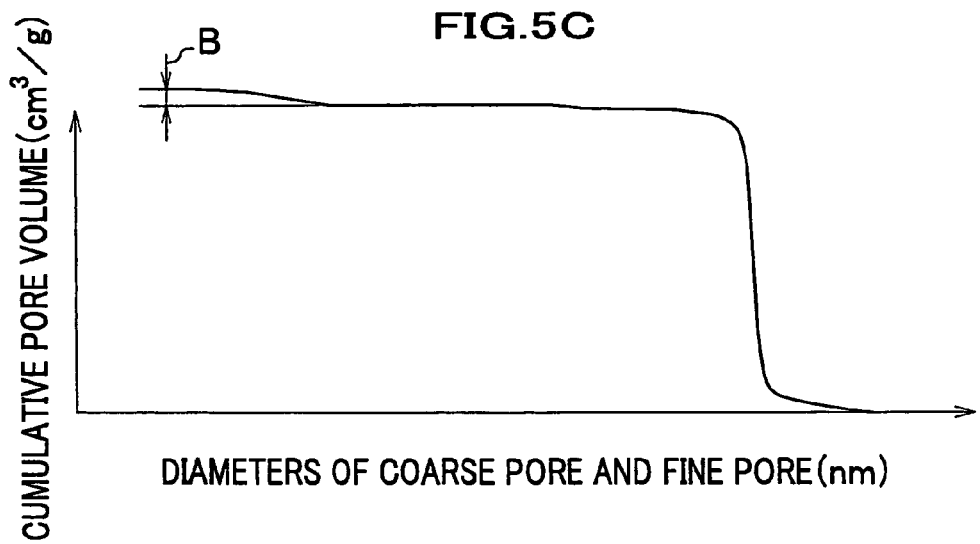
Figure 6A:
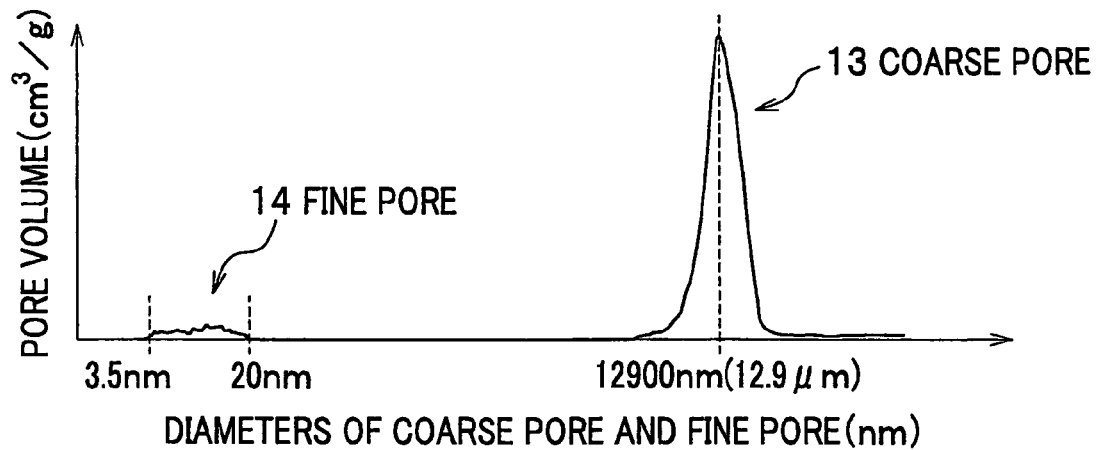
Figure 6B:
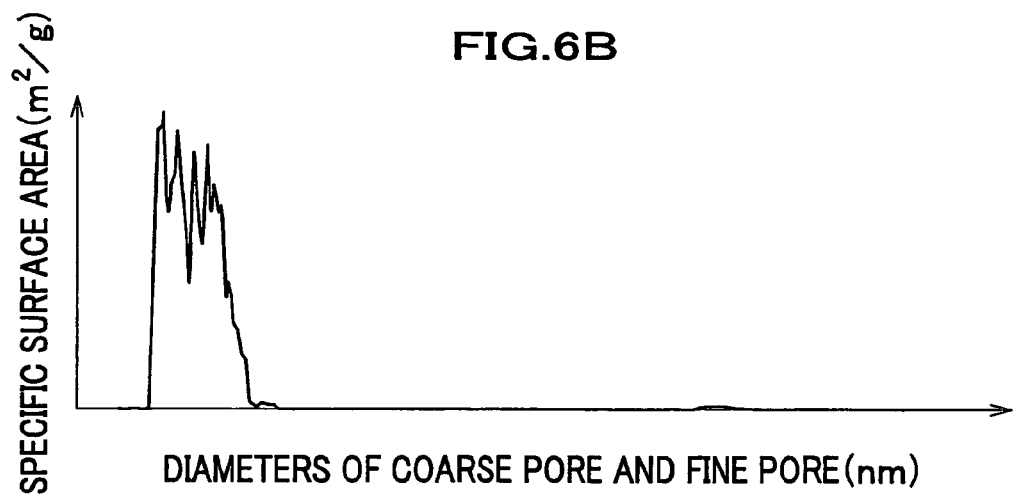
Figure 6C:
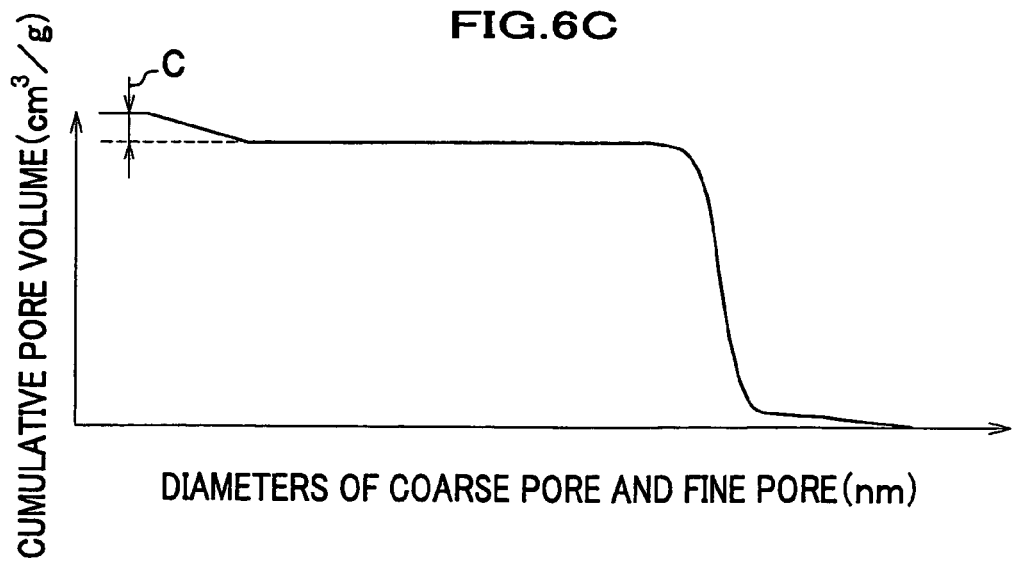
Figure 7A:
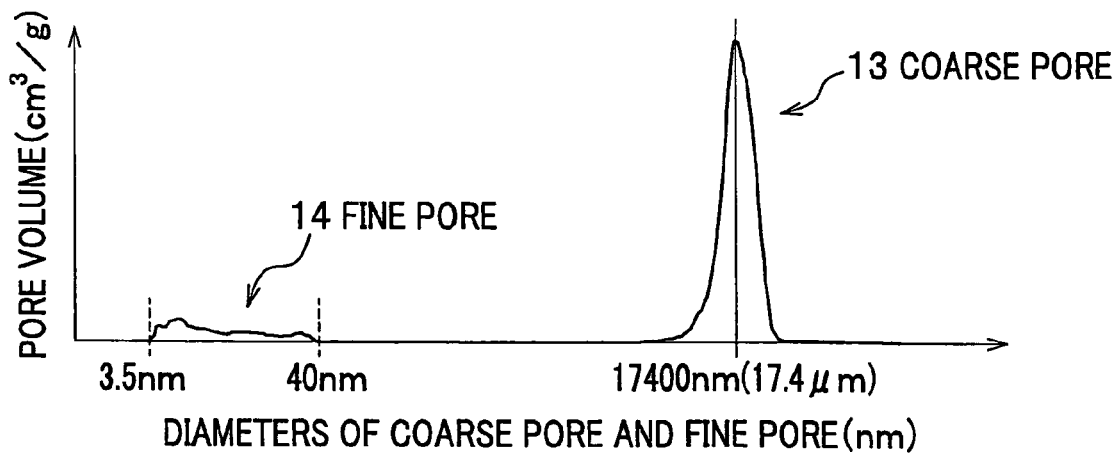
Figure 7B:
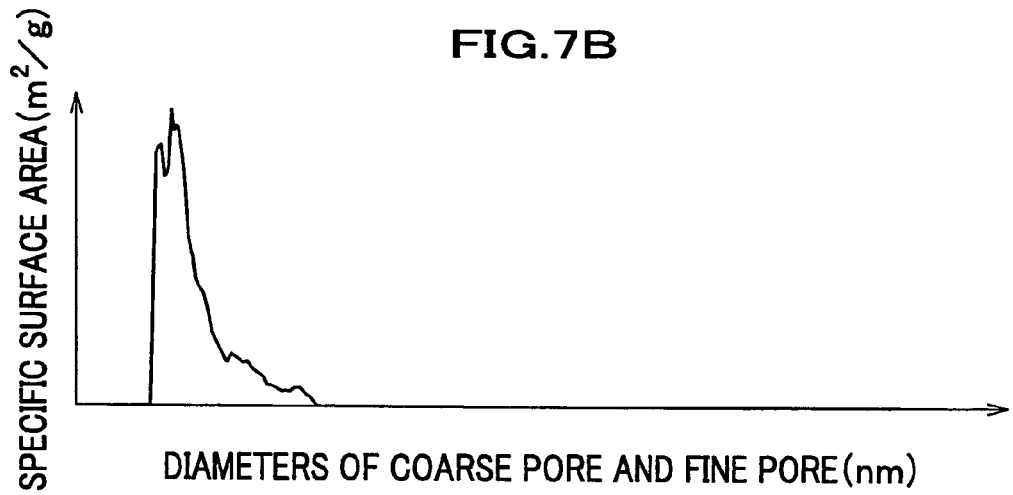
Figure 7C:
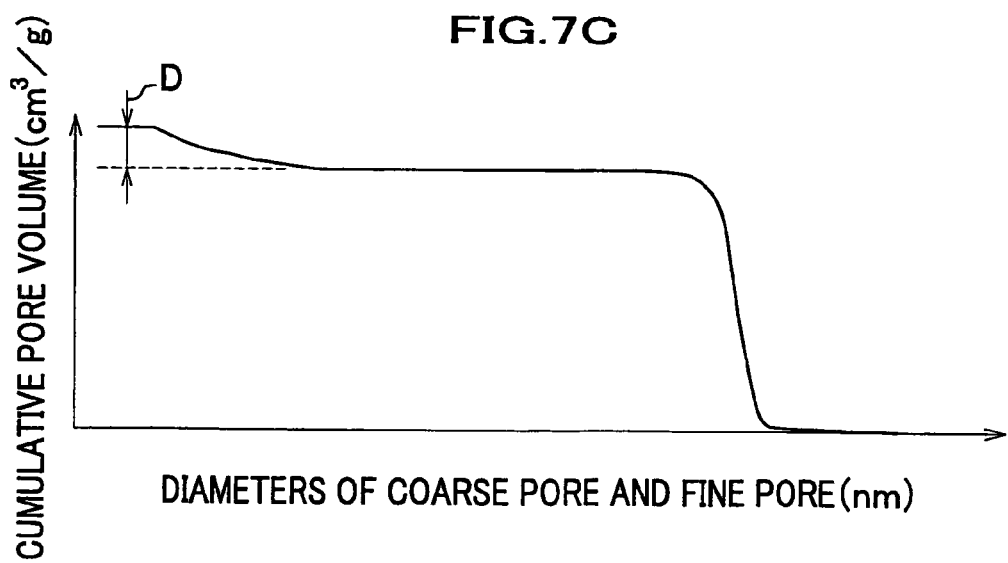
Figure 8:
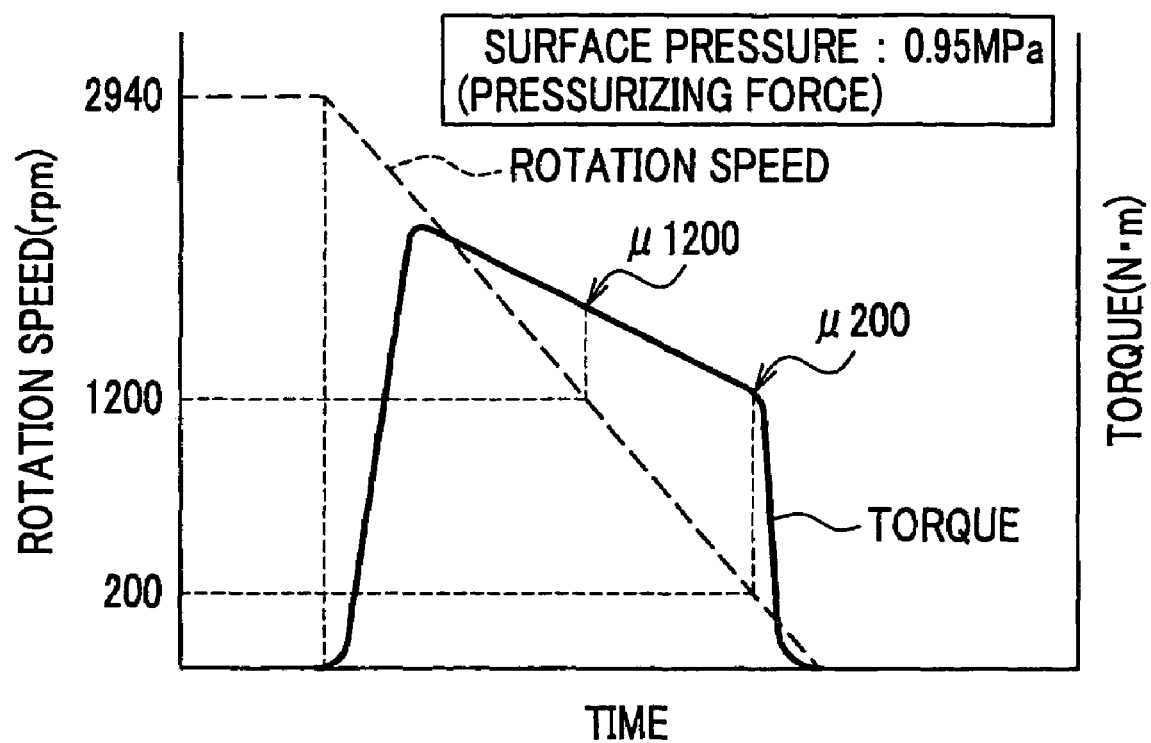

The upper level of FIG. 3 is an enlarged view of an A part of FIG. 2, the lower level of FIG. 3 is a diagram showing a section in the thickness direction of the wet friction member (carbon disk) in the A part, and is a partial figure near the surface of the wet friction member;

FIG. 4 (A) is a chart showing a pore volume for each of the diameters of the pores (coarse pores and fine pores) in the carbon fiber composite material manufactured in Example 1, FIG. 4 (B) is a chart showing a specific surface area for each of the diameters of the pores (the coarse pores and fine pores), and FIG. 4 (C) is a chart showing the cumulative pore volume of the pores (the coarse pores and fine pores);

FIG. 5 (A) is a chart showing a pore volume for each of the diameters of the pores (coarse pores and fine pores) in the carbon fiber composite material manufactured in Example 2, FIG. 5 (B) is a chart showing a specific surface area for each of the diameters of the pores (the coarse pores and fine pores), and FIG. 5 (C) is a chart showing the cumulative pore volume of the pores (the coarse pores and fine pores);

FIG. 6 (A) is a chart showing a pore volume for each of the diameters of the pores (coarse pores and fine pores) in the carbon fiber composite material manufactured in Example 3, FIG. 6 (B) is a chart showing a specific surface area for each of the diameters of the pores (the coarse pores and fine pores), and FIG. 6 (C) is a chart showing the cumulative pore volume of the pores (the coarse pores and fine pores);

FIG. 7 (A) is a chart showing a pore volume for each of the diameters of the pores (coarse pores and fine pores) in the carbon fiber composite material manufactured in Example 4, FIG. 7 (B) is a chart showing a specific surface area for each of the diameters of the pores (the coarse pores and fine pores), and FIG. 7 (C) is a chart showing the cumulative pore volume of the pores (the coarse pores and fine pores); and FIG. 8 is a torque wave form chart in a test machine used for a friction performance evaluation test of the wet friction member (carbon disk) manufactured in Example.

DETAILED DESCRIPTION OF THE PREFERRED EMBODIMENT

Figure 1:
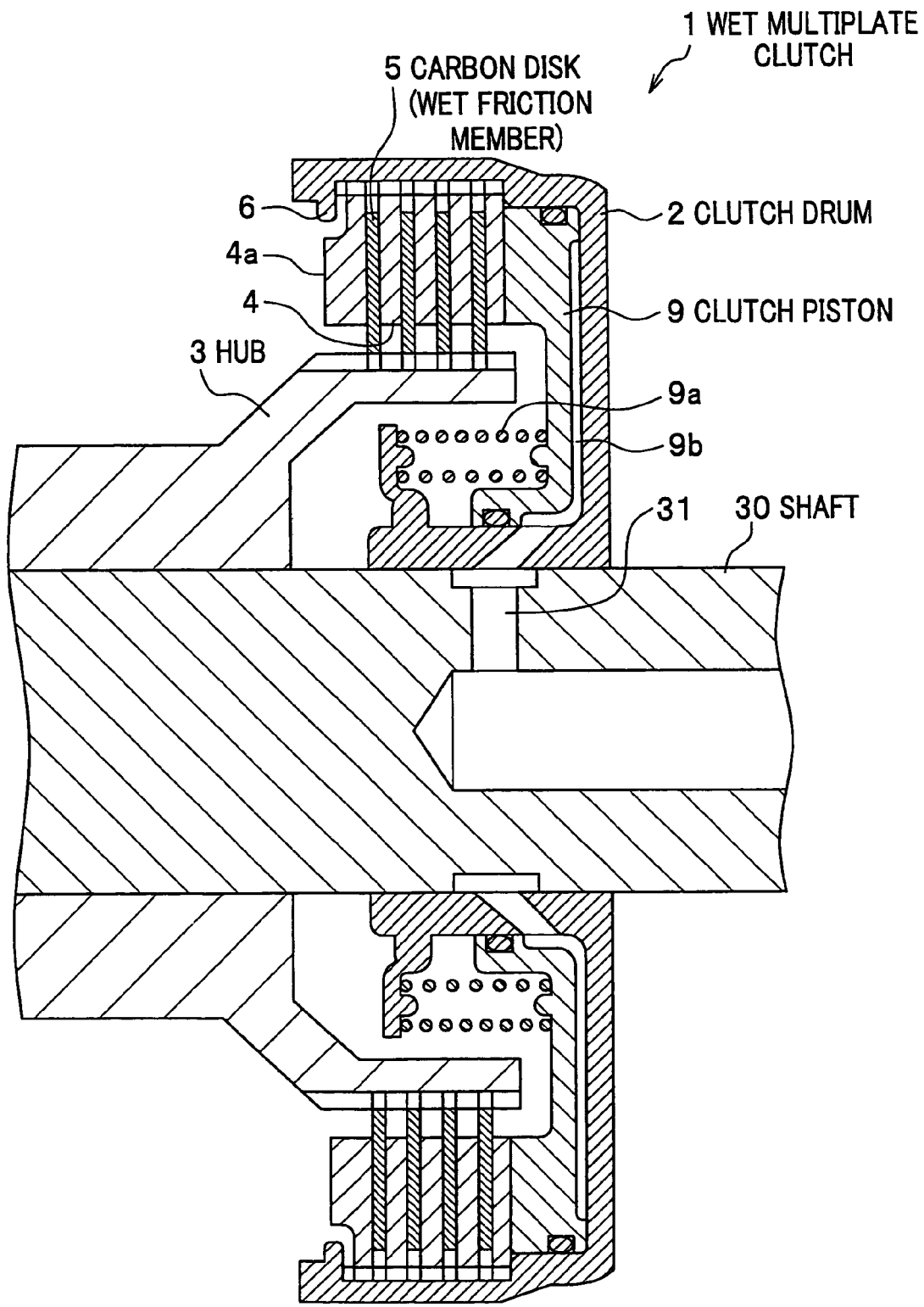
FIG. 1 is a sectional view of a wet multiplate clutch in which a wet friction member according to the embodiment is incorporated.

Next, an embodiment of the present invention will be explained in detail with reference to the drawings appropriately. FIG. 1 is a sectional view of a wet multiplate clutch in which a wet friction member (carbon disk) according to the embodiment is incorporated, FIG. 2 is a perspective view of the wet friction member (carbon disk) according to the embodiment, the upper level of FIG. 3 is an enlarged view of an A part of FIG. 2, the lower level of FIG. 3 is a diagram showing a section in the thickness direction of the wet friction member (carbon disk) in the A part, and is a partial view near the surface of the wet friction member.

Before explaining the wet friction member of the embodiment, a wet multiplate clutch in which the wet friction member is incorporated will be explained first.

As shown in FIG. 1, a wet multiplate clutch 1, having a known structure, is provided with a shaft 30 in which a flow path 31 of operating oil is formed, an approximately cylindrical clutch drum 2, an approximately cylindrical hub 3 fitted into the clutch drum 2, a disc-shaped clutch piston 9 fitted into the clutch drum 2 and forming a hydraulic chamber 9b communicated with the flow path 31 of the operating oil between the clutch piston 9 and the clutch drum 2, a plurality of circular separate plates 4 (made of SPCC (steel plate)) arranged in a direction along the central axis of the clutch drum 2, and circular carbon disks 5 fitted into the hub 3 so as to be alternately arranged with the separate plates 4. The carbon disk 5 corresponds to "wet friction member" in the Claims.

The clutch drum 2 is integrally attached to the shaft 30, and is integrally rotated with the shaft 30. The hub 3 is fitted into the shaft 30, and is rotated around the shaft 30 independent from the shaft 30. The clutch piston 9 is made slidable in the clutch drum 2 in a direction along the central axis of the clutch drum 2. The clutch piston 9 is urged toward the side of the hydraulic chamber 9b by a spring 9a.

As is well known, teeth (external teeth) are formed on the outer circumferential surface of the separate plate 4, and the separate plate 4 is slidably spline fitted into the inner circumference surface of the clutch drum 2 in a direction along the central axis of the clutch drum 2. Teeth (internal teeth) are formed on the inner circumference surface of the carbon disk 5, and the carbon disk 5 is slidably spline fitted into the outer circumferential surface of the hub 3 in a direction along the central axis of the clutch drum 2.

A receiving part 6 for receiving the slid separate plate 4 and carbon disk 5 is formed on the inner circumference surface of the clutch drum 2. A circular retaining plate 4a (made of SPCC (steel plate)) is arranged between the receiving part 6 and the carbon disk 5 on the inner circumference surface of the clutch drum 2. Teeth (external teeth) are formed on the outer circumferential surface of the retaining plate 4a, and the retaining plate 4a is slidably spline fitted into the inner circumference surface of the clutch drum 2 in a direction along the central axis of the clutch drum 2.

The wet multiplate clutch 1 transmits the torque of the shaft 30 to the side of the hub 3, or transmits the torque of the hub 3 to the side of the shaft 30 according to the use mode or the attachment position. Herein, the case where the torque of the shaft 30 is transmitted to the side of the hub 3 will be explained. When the clutch drum 2 is rotated around the central axis by the rotation of the shaft 30, the separate plate 4 and retaining plate 4a spline fitted into the inner circumference surface of the clutch drum 2 are rotated. On the other hand, when operating oil is transported into the hydraulic chamber 9b via the flow path 31 formed in the shaft 30, the clutch piston 9 resists the urging force of the spring 9a by the oil pressure, and moves toward the side of the hub 3. The separate plate 4, the carbon disks 5 and the retaining plate 4a are sandwiched between the clutch piston 9 and the receiving part 6 of the clutch drum 2. As a result, the carbon disk 5 comes into contact with the rotated separate plate 4 and retaining plate 4a, and thereby the hub 3 spline fitted into the carbon disk 5 is rotated around the central axis of the clutch drum 2.

(Wet Friction Member and Carbon Fiber Composite Material)

The wet friction member according to the embodiment incorporated in the above wet multiplate clutch 1, that is, the carbon disk 5 has a circular shape described above after the carbon fiber composite material to be explained below is cut as shown in FIG. 2, and the internal teeth 8 for being spline fitted into the hub 3 (refer to FIG. 1) are formed on the inner circumference surface.

As shown in FIG. 3, the carbon fiber composite material 10 constituting the carbon disk 5 is mainly composed of carbon fibers 11 and a matrix 12 joining the carbon fibers 11 with each other.

As shown in FIG. 3, the carbon fiber composite material 10 has coarse pores 13. The carbon fiber composite material 10 has the matrix 12 having fine pores 14 (though not shown in FIG. 3, refer to FIG. 4 (a)) to be described below. The coarse pores 13 will be firstly explained.

The coarse pores 13 are formed in a clearance between the carbon fibers 11 joined by the matrix 12, and the diameter of the coarse pores 13 is set to 4 μm to 60 μm in the embodiment. The diameter of the coarse pores 13 is determined by the volume fraction (except for the coarse pores 13 and the fine pores 14 (refer to FIG. 4 (a)) to be described below) of the carbon fibers 11 in the carbon fiber composite material 10 and the porosity (the volume fraction of the coarse pores 13 in the carbon fiber composite material 10) or the like of the coarse pores 13.

The fine pores 14 (refer to FIG. 4 (a)) have diameters of a nanometer (nm) order, and specifically, the diameter is within the range of 3.5 nm to 100 nm. The fine pores 14 are formed by the generation of volatile components and cracked gas from the matrix 12 in the manufacturing process (firing process to be described below) of the carbon fiber composite material 10. That is, the carbon fiber composite material 10 according to the embodiment alternatively uses the matrix 12 having the fine pores 14 having diameters of 3.5 nm to 100 nm).

Next, the effect of the carbon disk 5 (wet friction member) made of the carbon fiber composite material 10 will be explained.

As shown in FIG. 1, in the wet multiplate clutch 1 provided with the carbon disks 5, as is well known, ATF (automatic transmission fluid) is intruded into the coarse pores 13 (refer to FIG. 3) of the carbon disk 5. When the carbon disk 5 is pressed against the rotated separate plate 4 and the retaining plate 4a, the carbon disk 5 comes into contact with the separate plate 4 and the retaining plate 4a while sliding. In this case, since the coarse pores 13 are formed over the carbon disk 5 (the carbon fiber composite material 10) (refer to FIG. 3)) the ATF is uniformly distributed on the carbon disk 5 by the ATF being intruded into the coarse pores 13.

The carbon disk 5 (the carbon fiber composite material 10 (refer to FIG. 3)) has the matrix 12 having the fine pores 14 (refer to FIG. 4 (a)) of diameters of 3.5 nm to 100 nm.

As a result, the fine pores 14 give a larger specific surface area to the carbon disk 5 even if the absolute pore volume (the total volume of the fine pores 14) is small. Therefore, the carbon disk 5 has improved dynamic friction performance as compared with the wet friction member made of the conventional carbon fiber composite material.

Since the carbon disk 5 has the matrix 12 in which the fine pores 14 are formed, and the fine pores 14 have diameters of a nanometer (nm) order, the carbon disk 5 can prevent the inhibition due to the porosity of the fine pores 14 of the structural strength required as the wet friction member.

Though an ATF additive agent has been conventionally used so as to control the dynamic friction performance, the dynamic friction performance of the carbon disk 5 can be controlled by the amount of the fine pores 14 to be formed. Thereby, the ATF additive agent may not be positively used, which is sensitive to temperature change such as an organic additive agent and may be deteriorated at an early stage in a severe friction atmosphere.

Since the carbon disk 5 has the coarse pores 13 (refer to FIG. 3) in addition to the fine pores 14 (refer to FIG. 4 (a)), the porosity is increased as compared with one having only the fine pores 14. That is, the immunity of an oil film is certainly improved by adding the coarse pores 13, and the dynamic friction performance is enhanced. Therefore, according to the carbon disk 5, judder and shock or the like at the time of the shift transmission are more effectively suppressed.

(Method for Manufacturing Carbon Fiber Composite Material)

The carbon fiber composite material 10 is molded by pressurizing and heating the carbon fibers 11 containing a resin by a hot press, and is then manufactured by firing.

Examples of the carbon fibers 11 include a pitch carbon fiber, a polyacrylonitrile carbon fiber and a rayon carbon fiber. The fiber length and fiber diameter of the carbon fiber are not particularly limited. Examples of the resins include thermosetting resins such as a phenol resin, a furan resin, a polyimide resin and an epoxy resin. Above all, in the firing process, the resins causing solid phase thermal decomposition to generate the cracked gas and carbonization are preferable. In the firing temperature, the resins which do not generate excessive cracked gas are still more preferable. However, though it has been known that the thermoplastic resin representing pitch or the like originating from petroleum and coal is generally accompanied by the intense generation of gas at the time of carbonization, for example, the thermoplastic resin may be used in combination with the above-mentioned thermosetting resin, or used by methods for carbonizing while suppressing the generation of volatilization gas at high pressure, for use as the matrix after subjecting to preprocessing such as preliminary firing, etc.

The compounding ratio of the resin to carbon fiber 11 can be suitably adjusted according to the size of the diameter of the coarse pore 13 of the carbon fiber composite material 10 to be manufactured. It is preferable that the firing is performed at 300° C. to 800° C. for about 30 minutes to about 2 hours.

In the manufacturing method of the carbon fiber composite material 10, the resin is selected so that the diameters of the fine pores formed are set to 3.5 nm to 100 nm. Known measuring instruments such as a porosimetry using mercury and helium may be used for measuring the fine pores.

The carbon disk 5 as the wet friction member according to the embodiment can be manufactured by cutting the carbon fiber composite material 10 obtained thus into the shape shown in FIG. 2.

Though the embodiment of the present invention is explained above, the present invention is not limited to the embodiment. For example, though the embodiment shows the example in which the carbon fiber composite material 10 is applied to the wet multiplate clutch 1 of an automatic change gear, the carbon fiber composite material 10 may be used for a transfer clutch and brake of a 4WD vehicle.

Though the embodiment shows the example in which the carbon disk 5 is produced by cutting the carbon fiber composite material 10, the present invention is not limited thereto. For example, the carbon fiber composite material 10 may be joined to a cored bar which is to be a substrate (wet friction member).

EXAMPLES

Next, examples confirming the effect of the carbon fiber composite material of the present invention will be explained.

Example 1

<Manufacturing of Carbon Fiber Composite Material>

In Example 1, a polyacrylonitrile carbon fiber (short fiber) and a resole phenol resin were used for manufacturing the carbon fiber composite material. The resole phenol resin causes solid phase thermal decomposition to generate cracked gas in a firing temperature region (for example, 300°

C. to 800° C.). The actual carbon ratio of the resin at the time of firing at 400° C. was 86 mass %, and the actual carbon ratio at the time of firing at 600° C. was 62 mass %. The actual carbon ratio at the time of firing at 800° C. was 53 mass %.

In the embodiment, the resin was contained in the carbon fiber (short fiber), and a molded product made of the resin-containing carbon fiber was obtained by pressurizing and heating the carbon fiber-containing resin by hot press. Respective compounding ratios of the carbon fiber and resin to the total amount of the carbon fiber and resin at this time were 60 mass % for the carbon fiber and 40 mass % for the resin. The pressure at the time of molding by the hot press was 20 MPa, and the heating temperature was 180° C.

Then, the carbon fiber composite material was manufactured by firing the obtained molded product at 400° C. under an argon atmosphere for 2 hours. The diameters of the coarse pores and fine pores of the manufactured carbon fiber composite material, and the specific surface area of the carbon fiber composite material were measured by a mercury porosimetry.

FIG. 4 (A) is a chart showing a pore volume for each of the diameters of the pores (coarse pores and fine pores). FIG. 4 (B) is a chart showing a specific surface area for each of the diameters of the pores (the coarse pores and fine pores). FIG. 4 (C) is a chart showing the cumulative pore volume of the pores (the coarse pores and fine pores).

Table 1 described respectively open porosity (the porosity of the coarse pores and fine pores opened on the surface of the carbon fiber composite material), cumulative pore volume, cumulative specific surface area, average pore diameter and maximum pore diameter as the features of the pores composed of the coarse pores and fine pores obtained from these measurement results, the distribution of the coarse pores, the median pore diameter (volume basis) of the coarse pores and the cumulative pore volume of the coarse pores as the features of only the coarse pores, and the distribution of the fine pores, the median pore diameter of the fine pores (volume basis) and the cumulative pore volume of the fine pores as the features of only the fine pores.

<Friction Performance Evaluation Test of Carbon Fiber Composite Material>

The carbon disk 5 having the shape shown in FIG. 2 by cutting the manufactured carbon fiber composite material was produced, and the friction performance evaluation test of the carbon disk 5 was performed.

An SAE No. 2 test machine was used for the friction performance evaluation test. FIG. 8 is a torque wave form chart in the test machine.

In the friction performance evaluation test, the carbon disk 5 was first sandwiched by the same two separate plates as the separate plate 4 shown in FIG. 1, and the carbon disk 5 and the separate plates were incorporated in the SAE No. 2 test machine. Friction coefficients μ 200 and μ 1200 were measured by performing the friction performance evaluation test under the conditions of surface pressure of 0.95 MPa, rotation speed of 2940 rpm, inertia of 0.12 kg·m², test oil temperature of 100° C. and number of test cycles of 500 cycles. The μ 200 and μ 1200 are shown in the torque wave form chart in the SAE No. 2 test machine of FIG. 8. The μ 1200 is the friction coefficient at the time of rotation speed of 1200 rpm, and the μ 200 is the friction coefficient at the time of rotation speed of 200 rpm just before the torque is rapidly decreased. Herein, μ is a value obtained by dividing the torque by the surface pressure when the clutch is engaged. These friction coefficients are based on a braking test for stopping a rotation mass. The ratio of μ 200/μ 1200 calculated from μ 200 and μ 1200 measured (hereinafter, referred merely to as "μ ratio") was calculated. Table 1 shows the result.

Example 2 to Example 4

In Example 2 to Example 4, respective compounding ratios of the carbon fiber and resin to the total amount of the carbon fiber and resin were set as shown in Table 1, and the carbon fiber composite material was manufactured in the same manner as in Example 1 except that the resole phenol resin was used, in which the actual carbon ratios at 400° C., 600° C. and 800° C. were set to the values shown in Table 1.

The feature of the pores composed of the coarse pores and fine pores, feature of only the coarse pores, and feature of only the fine pores of respective carbon fiber composite materials manufactured in Example 2 to Example 4 were calculated in the same manner as in Example 1, and the friction performance evaluation test of the carbon disk 5 obtained from each carbon fiber composite material was performed. Table 1 shows the result. FIG. 5 (A) is a chart showing a pore volume for each of the diameters of the pores (coarse pores and fine pores) in the carbon fiber composite material manufactured in Example 2. FIG. 5 (B) is a chart showing a specific surface area for each of the diameters of the pores (the coarse pores and fine pores). FIG. 5 (C) is a chart showing the cumulative pore volume of the pores (the coarse pores and fine pores). FIG. 6 (A) is a chart showing a pore volume for each of the diameters of the pores (coarse pores and fine pores) in the carbon fiber composite material manufactured in Example 3. FIG. 6 (B) is a chart showing a specific surface area for each of the diameters of the pores (the coarse pores and fine pores). FIG. 6 (C) is a chart showing the cumulative pore volume of the pores (the coarse pores and fine pores). FIG. 7 (A) is a chart showing a pore volume for each of the diameters of the pores (coarse pores and fine pores) in the carbon fiber composite material manufactured in Example 4. FIG. 7 (B) is a chart showing a specific surface area for each of the diameters of the pores (the coarse pores and fine pores). FIG. 7 (C) is a chart showing the cumulative pore volume of the pores (the coarse pores and fine pores).

TABLE 1

|  |  | Example 1 | Example 2 | Example 3 | Example 4 |
| --- | --- | --- | --- | --- | --- |
| Raw Material Composition | Carbon Fiber [mass %] | 60 | 40 | 60 | 60 |
|  | Phenol Resin [mass %] | 40 | 60 | 40 | 40 |
| Thermal Decomposition of Resin (Actual Carbon Ratio at Each Temperature) | 400° C. [mass %] | 86 | 46 | 84 | 63 |
|  | 600° C. [mass %] | 62 | 38 | 65 | 36 |
|  | 800° C. [mass %] | 53 | 35 | 45 | 23 |
| Feature of Pores | Open Porosity [vol %] | 36 | 50 | 34 | 48 |
|  | Cumulative Pore Volume | 0.38 | 0.69 | 0.39 | 0.60 |

TABLE 1-continued

|  |  | Example 1 | Example 2 | Example 3 | Example 4 |
|---|---|---|---|---|---|
|  | [cm³/g] |  |  |  |  |
|  | Cumulative Specific Surface Area [m²/g] | 0.52 | 3.9 | 13 | 41 |
|  | Average Pore Diameter [μm] | 2.9 | 0.70 | 0.12 | 0.058 |
|  | Maximum Pore Diameter (peak) [μm] | 14 | 34 | 13 | 17 |
| Feature of Only Coarse Pores | Distribution [μm] | 4.0-25 | 15-60 | 4.0-40 | 7.0-35 |
|  | Median Pore Diameter (Volume Basis) [μm] | 14 | 31 | 14 | 18 |
|  | Cumulative Pore Volume [cm³/g] | 0.37 | 0.68 | 0.37 | 0.52 |
| Feature of Only Fine Pores | Distribution [μm] | 25-100 | 6.5-50 | 3.5-20 | 3.5-40 |
|  | Median Pore Diameter (Volume Basis) [μm] | 55 | 30 | 7.0 | 7.0 |
|  | Cumulative Pore Volume [cm³/g] | 0.0073 | 0.012 | 0.022 | 0.078 |
| Dynamic Friction Performance | μ ratio | 1.039 | 0.996 | 0.985 | 0.957 |

<Feature of Carbon Fiber Composite Material and Evaluation of Friction Performance>

As shown in FIG. 4(A), FIG. 5(A), FIG. 6(A) and FIG. 7(A), the coarse pores having diameters of a micrometer (μm) order, and the fine pores having diameters of a nanometer (nm) order are formed in each carbon fiber composite material manufactured in Example 1 to Example 4.

As is apparent from Table 1, the carbon disks 5 produced in Example 1 to Example 4, have the μ ratio of 1.039 or less as the index of dynamic friction performance, and are excellent in view of the prevention of judder vibration. In the comparison of the μ ratios between the carbon fiber composite materials manufactured in Example 1 to Example 4, as shown in Table 1, the μ ratio is reduced in order of Example 1, Example 2, Example 3 and Example 4. That is, the dynamic friction performance is increased in order of Example 1, Example 2, Example 3 and Example 4. The μ ratio is reduced so the diameters (median diameter) of the fine pores are reduced, and the dynamic friction performance is improved.

In comparison of the amounts of existence of the fine pores between the carbon fiber composite materials manufactured in Example 1 to Example 4, as shown in the capacity difference shown by A in FIG. 4 (C), the capacity difference shown by B in FIG. 5 (C), the capacity difference shown by C in FIG. 6 (C) and the capacity difference shown by D in FIG. 7 (C), the amount of existence of the fine pores is increased in order of Example 1, Example 2, Example 3 and Example 4.

Furthermore, the cumulative pore volume of the fine pores in Example 1 was 0.0073 cm³/g. The cumulative pore volume of the fine pores in Example 2 was 0.012 cm³/g. The cumulative pore volume of the fine pores in Example 3 was 0.022 cm³/g. The cumulative pore volume of the fine pores in Example 4 was 0.078 cm³/g. The diameters of the fine pores of these cumulative pore volumes are 100 nm or less.

In comparison of the specific surface areas between the carbon fiber composite materials, as shown in Table 1, the specific surface area is increased in order of Example 1, Example 2, Example 3 and Example 4. That is, the μ ratio is reduced as the amount of the fine pores having the diameters of a nanometer (nm) order is increased. That is, the dynamic friction performance is improved as the amount of the fine pores having the diameters of a nanometer (nm) order is increased.

Since the carbon fiber composite materials manufactured in Example 1 to Example 4 had the coarse pores having the diameters of a micrometer (μm) order, and the fine pores having the diameters of a nanometer (nm) order by the above friction performance evaluation test, the carbon fiber composite materials turned out to exhibit excellent dynamic friction performance.

While the present invention has been described by referring to the embodiments, and working examples, those skilled in the art will appreciate that various modifications, additions and substitutions are possible, without departing from the scope and spirit of the invention.

What is claimed is:

1. A carbon fiber composite material comprising;
   carbon fibers, and
   a carbon matrix provided between the carbon fibers and joining the carbon fibers with each other,
   the matrix having fine pores having diameters of 3.5 nm to 100 nm.

2. The carbon fiber composite material according to claim 1, further comprising coarse pores formed between the carbon fibers and having diameters of 4 μm to 60 μm.

3. The carbon fiber composite material according to claim 1, further comprising coarse pores formed between the carbon fibers and having median diameters of 5.0 μm to 30 μm.

4. The carbon fiber composite material according to claim 1, wherein said carbon fiber comprises a pitch carbon fiber, a polyacrylonitrile carbon fiber or a rayon carbon fiber.

5. The carbon fiber composite material according to claim 1, wherein said carbon matrix is made from a phenol resin.

6. A wet friction member comprising the carbon fiber composite material according to any one of claims 1 to 5.

* * * * *